United States Patent Office 2,864,481
Patented Dec. 16, 1958

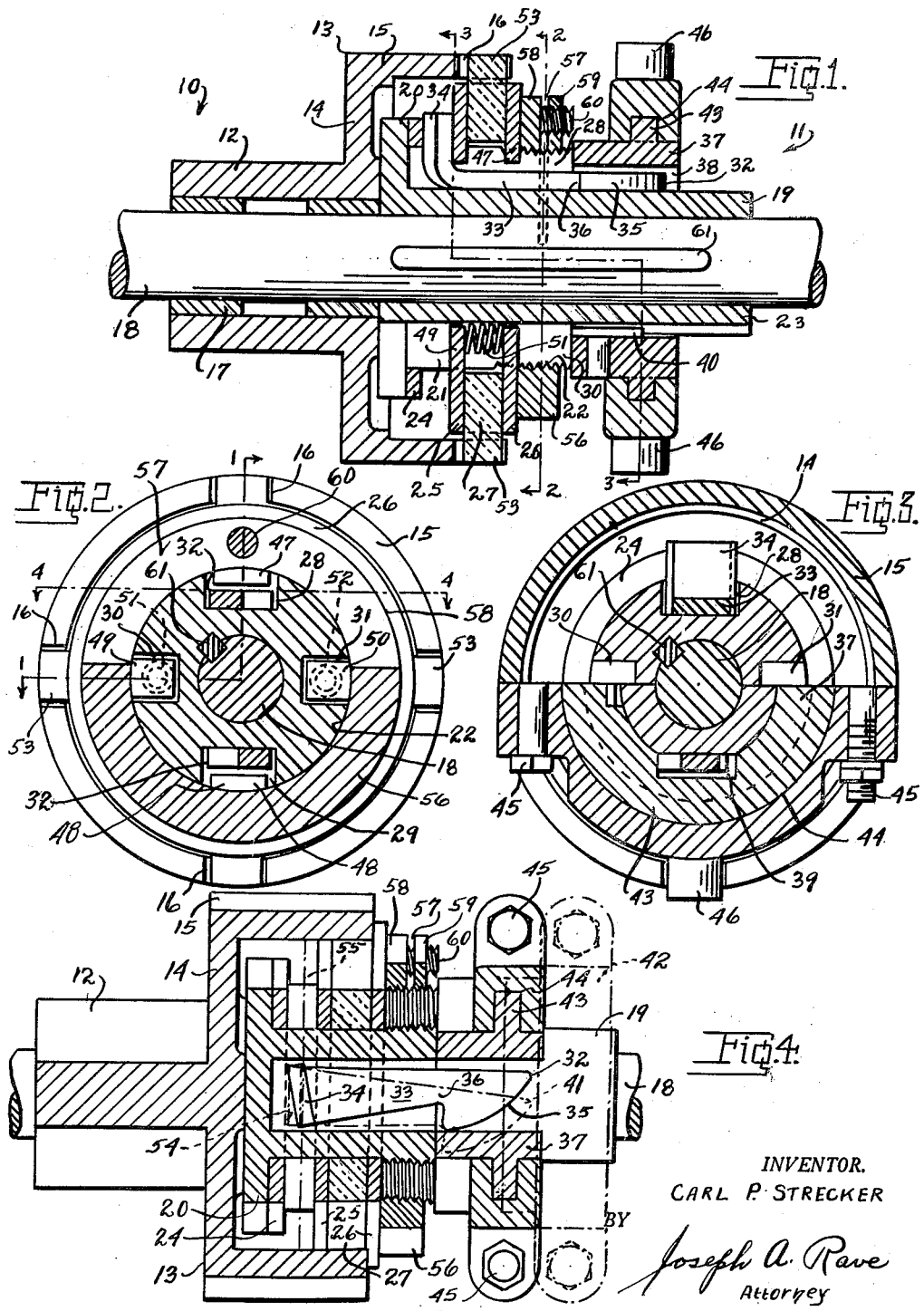

2,864,481

CLUTCH WITH ADJUSTING MEANS

Carl P. Strecker, Cincinnati, Ohio, assignor to The Conway Clutch Company, Cincinnati, Ohio, a corporation of Ohio Application August 18, 1955, Serial No. 529,164

3 Claims. (Cl. 192—111)

This invention relates to improvements in a friction clutch, particularly to improvements in the type that is adjustable to a torque load before slipping.

Friction clutches of this specific type are well known and is not new, per se, in this application.

In the past, the means for adjusting the clutch to the slip point, or amount of torque transmited therethrough, was quite cumbersome and required a plurality of independent movable elements. Furthermore the adjusting and wear take up means was operable only in increments, which, while generally acceptable, were not the most desirable at critical points of torque slippage, or adjustable to compensate for minute wear.

The present invention discloses a mechanism that permits of the adjustment of the torque slip point, and the take up for wear, to be effected through minute amounts to maintain the clutch at the desired point at all times.

It is, therefore, the principal object of the present invention to provide, in a friction slip clutch, adjusting means for positioning the friction plates at the most desirable point.

Another object of this invention is the provision of a clutch slip plate adjusting means that can be readily operated and locked with a minimum of effort to and in its adjusted positions.

A still further and specific object of the present invention is the provision of a nut for a friction clutch that can be locked in adjusted positions regardless of the minuteness of adjustment necessary to obtain the desired result from the clutch.

In friction clutches as heretofore known the drive and driven plates were basically of steel with one or more of said driven or driving plates faced with friction material for obtaining the necessary drive through the clutch. This construction resulted in said plate or plates being costly in manufacture and replacement.

It is, therefore, a further object of this invention to provide a clutch with one or more of the drive or driven plates, formerly made of steel and friction material laminations, formed throughout of the usual friction material thereby eliminating the cost of assembling the said steel plate and friction material, and at the same time provide a plate that is of equal if not better qualities in the operation of the clutch.

Other objects and advantages of the present invention will be readily apparent by reference to the following specification considered in conjunction with the accompanying drawings forming a part thereof, and it is to be understood that any modifications may be made in the exact structual details there shown and described, within the scope of the appended claims, without departing from or exceeding the spirit of the invention.

In the drawings:

Fig. 1 is a longitudinal sectional view through a clutch embodying the improvements of the present invention as seen, in general, from line 1—1 on Fig. 2; certain parts in Fig. 1 being illustrated in elevation for clearness in disclosure.

Fig. 2 is a transverse sectional view through the clutch as seen from line 2—2 on Fig. 1.

Fig. 3 is a transverse sectional view through the clutch of Fig. 1 taken through planes ahead of and behind the plane of Fig. 2.

Fig. 4 is a longitudinal sectional view through the clutch, similar to Fig. 1, taken through a plane between the axis thereof and its upper end as seen from line 4—4 on Fig. 2.

Throughout the several views of the drawings similar reference characters are employed to denote the same or similar parts.

The clutch of the present invention comprises a pair of clutch members, respectively indicated by reference numerals 10 and 11, with said members having associated therewith the drive and driven clutch elements. The clutch member 10 may be considered, for the purpose of description, as the clutch driving member while the clutch member 11 may be considered as the clutch driven member. It is to be understood that the motive power, a pulley, a gear, a chain sprocket, or the like, may be attached to either clutch member thereby making same the driver and the remaining clutch member the driven.

The clutch member 10 comprises a sleeve 12 having at one end an enlarged cup-like receptacle 13. The receptacle 13 comprises a base 14 integral with and radially of the sleeve 12 with a flange 15 outwardly, normally, projecting from the periphery of the base 14. The flange 15 is provided inwardly of its free edge, at spaced points therearound, with slots 16; there is shown in the drawings four such slots but it is to be understood that this number may be increased or decreased depending upon the size and power to be transmitted through the clutch. The clutch member 10 is provided interiorly of its sleeve 12 with bushings 17 whereby it is freely mounted and rotated on a shaft 18.

The driven clutch member 11 includes a body portion 19 having at its inner end a radial flange 20 which, as will presently be made clear, constitutes the clutch thrust member. Forwardly of the flange 20 the clutch member body portion 11 is provided with an enlarged central portion 21 generally circular in cross section and terminating at its outer end in threads 22. Further, forwardly of the said enlarged central portion 21 the clutch member body portion 19 is provided with a sleeve like extension 23.

It should be here noted that the power transmitting member, a gear, pulley, or the like, may be keyed or otherwise secured to the sleeve 12 of the clutch member 10 for making such clutch member the driver, or the sleeve 23 of the clutch member 11 may be extended to have secured thereto the said power transmitting element, gear, pulley, or the like.

Mounted on the clutch member central portion 21 and lying against the face of the flange 20 is a thrust bearing plate or ring 24. The said clutch member 11 on its said central portion 21, also, has slidably mounted thereon alternate clutch friction plates with, as disclosed herein, clutch plates 25 and 26, constituting the driven plates while an intermediate plate 27 constitutes the driving plate. It is to be understood that additional driven and driving plates may be employed with said plates alternating and respectively attached to their clutch body member, as will presently be made clear.

The clutch member 11 has its body portion 19 provided with longitudinal passageways, in the form of keyways, there being illustrated in the drawings passageways 28 and 29 at diametrically opposite points and passageways 30 and 31, again at diametrically opposite points and respectively intermediate the passageways 28 and 29. As seen in Fig. 2, the passageways 28 and 29 are relatively wide by comparison to their depth. Disposed in each said passageway is a clutch plate actuating lever illustrated most clearly in Fig. 4 and since said levers are substantially identical, it is deemed sufficient if but one of them is specifically identified and described.

As seen in Fig. 4 the clutch plates actuating lever 32 comprises an elongated body portion 33 having an upstanding finger 34 at one end and a cam face 35 at its other end. The body portion 33 is reduced as at 36 immediately ahead of the cam face 35.

In practice, and as seen in Fig. 1, each clutch plate actuating lever 32 is mounted on the base or bottom of its passageway 28 or 29 with its upstanding finger 34 disposed between the thrust bearing plate or ring 24 and an adjacent friction clutch plate, plate 25 for example.

Disposed on the sleeve 23 of the clutch member body portion 19 is the clutch control member or slider 37. The slider 37 is provided at diametrically opposite points with passageways 38 and 39 which are respectively aligned with the passageways 28 and 29 of the clutch member body portion 19. Said slider 37 in order to maintain said alignment, is provided with a key 40 adapted to ride in one of the passageways 30 and 31 in said clutch member body portion 19.

In practice and with the clutch plates disconnected the actuating levers 32 each have a position such as illustrated in phantom lines at 41 in Fig. 4. At this time the slider 37 is in a withdrawn position, as illustrated in phantom lines in Fig. 4 and indicated by the reference numeral 42.

In order to shift the slider 37 between its clutch operative position, shown in full lines in the drawings, and its clutch in operative position the said phantom line 42 position, the slider 37 is provided, intermediate its ends, with a radial flange 43 adapted to be received in a groove in a shifter 44 which, as illustrated in Fig. 3, is formed of two separable halves joined to one another through bolts and nuts 45 on each side thereof. Each half of the shifter has projecting therefrom a circular boss 46 for connection with a clutch shifter lever, not shown.

Each of the driven friction plates 25 and 26 has inwardly projecting from its periphery a plurality of lugs with two opposed lugs 47 and 48 extending into passageways 28 and 29 but stopping short of the clutch plates actuating levers 32, as illustrated in Fig. 2. Extending inwardly of said driven plates 25 and 26 are lugs 49 and 50 which project into passageways 30 and 31 stopping short of the base or bottom of said passageways. Said last mentioned lugs 49 and 50 of the plates 25 and 26 respectively form abutments for springs 51 and 52 which are located in the passageways 30 and 31, and the function of which springs will presently be made clear.

Driving plate 27 is shown as formed of one piece of the usual friction material which commonly takes the form of hydraulically pressed asbestos brake material. The said driving friction plate 27 has outwardly projecting from its periphery a plurality of lugs 53 there being as many such lugs 53 as the clutch member flange 15 has notches 16 and with a lug 53 in each notch.

In practice the shifting of the slider 37 from its phantom line position 42 to the solid line position thereof actuates the clutch lever 32 from its phantom line position 41 to its solid line position thereby actuating the finger 34 of the lever 41 from its phantom line position 54 to its solid line position and shifting the clutch plate 25 from its phantom line position 55 to its solid line position and thereby effecting a driving connection between the driven plates 25 and 26 and the driving plate 27.

The shifting of the clutch plates is effected by a corner of the upstanding finger 34, upon the actuating of said finger as above set forth, against the thrust bearing plate or ring 24 for compressing the clutch plates against an adjustable nut or thrust member 56. The thrust member 56 is herein illustrated as a cylindrical nut having a vertical slit 57 downwardly from its upper end to a point just short of its axis. By this construction the thrust nut, above its axis, is provided with a vertical portion or ear 58, on one side of the slit 57, and a second vertical portion for ear 59, on the other side of said slit. Threaded into and through one of said ear portions, ear portion 59, for example, is an Allen head dog screw 60 which has its inner end bearing against the remaining ear portion, ear portion 58, for example.

In practice the nut 56 is actuated toward the clutch member flange 20 to the point, that, with the clutch plates shifter levers 32 in the solid line position of Figs. 1 and 4 the desired torque is transmitted between the clutch members 10 and 11 whereupon the lock screw 60 is actuated for outwardly actuating the ear portion 59 and clamping the nut against the threads 22. Preferably, the ear portion 59 is made narrower than the ear portion 58 so that upon the actuation of lock screw 60 the ear portion 59 is actuated relative to the ear portion 58. By this construction the face of the adjustable nut or thrust member 56, which is opposed to the friction plate 26, remains in the desirable plane, and does not project inwardly of this plane as would be the case if said nut ear portion 58 were made narrower and possibly deflected under pressure of the dog screw 60.

The driven clutch member 11 is keyed to the shaft 18 through the key 61 whereby the shaft 18 receives its rotation.

Actuation of the slider 37 from its solid line to its phantom line position 42 frees the levers 32 and permits them to take their phantom line positions 41 and thereby permits the driving and driven plates 25, 26 and 27 to separate from one another. Assisting in this separation are the springs 51 and 52 which are under slight compression even with the friction plates out of driving contact.

From the foregoing, it will be noted that there has been provided an adjusting or back up nut which may be given any amount of radial or angular adjustment, even though quite minute, whereupon the nut may be securely locked in position by the dog screw 60. By this construction even the slightest wear on the friction plates 25, 26 and 27 may be compensated for. By this construction, also, the plates may be adjusted relative to one another to transmit the exact amount of torque instead of a torque that may or may not be at the desired point.

From the foregoing it should also be noted that the driving friction plate is a solid member formed from, preferably, asbestos material such as used for brake linings and it should be noted that by this construction the finished driving plate is a molded disc thereby eliminating the necessity of riveting thin brake linings to a steel center disc, and the elimination of the possibility of said rivets directly engaging with the steel face of the driven discs, marring said steel faces, and the loss of friction inherent under such conditions.

What is claimed is:

1. In a friction clutch the combination of a first clutch member comprising a sleeve, an enlarged cup-like receptacle at one end of the sleeve, said cup-like receptacle including a base radially of the sleeve and a flange normal to said base at the periphery thereof, said cup-like flange having slots formed inwardly of its free edge at spaced intervals therearound, a second clutch member comprising a cylindrical body portion and a radial flange at the inner end thereof disposed within said first clutch member cup-like receptacle, said second clutch member cylindrical sleeve having formed downwardly of its periphery a plurality of slots, a clutch plate formed of material normally considered as non-friction disposed on the second clutch member cylindrical body portion and having lugs inwardly projecting therefrom into the slots thereof, a clutch plate formed wholly of material normally considered friction material disposed within the first clutch member cup-like receptacle and having peripheral lugs projecting into the cup-like receptacle flange slots, means carried by one of said clutch members co-operating with said second clutch member radial flange for pressing said clutch plates into driving engagement, and an adjustable thrust member nut threadedly carried by said one clutch member against which said clutch plates are pressed, said adjustable thrust member nut having a thrust face normal to its axis and a face remote from its thrust face and said adjustable thrust member nut being vertically slit on one side of its axis, said slit being formed at a point nearer its remote face than its thrust face to provide nut portions substantially parallel to one another in said nut on one side of its axis, said nut portion including the thrust face being thicker than the nut portion including the remote face and which nut portions are slightly displaceable relative to one another in the direction of extent of said nut axis, and screw means carried by the thinner nut portion and impinging on the thicker nut portion for displacing said thinner nut portion relative to the other and thereby clamp the nut on said clutch member in adjusted position.

2. In a friction clutch the combination of a first clutch member comprising a sleeve, an enlarged cup-like receptacle at one end of the sleeve, said cup-like receptacle including a base radially of the sleeve and a flange normal to said base at the periphery thereof, said cup-like flange having slots formed inwardly of its free edge at spaced intervals therearound, a second clutch member comprising a cylindrical body portion and a radial flange at the inner end thereof disposed within said first clutch member cup-like receptacle, said second clutch member cylindrical sleve having formed downwardly of its periphery a plurality of slots, a clutch plate disposed on the second clutch member cylindrical body portion and having lugs inwardly projecting therefrom into the slots thereof, a clutch plate disposed within the first clutch member cup-like receptacle and having peripheral lugs projecting into the cup-like receptacle flange slots, means carried by one of said clutch members cooperating with said second cluth member radial flange for pressing said clutch plates into driving engagement, and an adjustable thrust member nut threadedly carried by said one clutch member against which said clutch plates are pressed, said adjustable thrust member nut having a thrust face normal to its axis and a face remote from its thrust face and said adjustable thrust member nut being vertically slit on one side of its axis, said slit being formed at a point nearer its remote face than its thrust face to provide nut portions substantially parallel to one another in said nut on one side of its axis, said nut portion including the thrust face being thicker than the nut portion including the remote face and which nut portions are slightly displaceable relative to one another in the direction of extent of said nut axis, and screw means carried by the thinner nut portion and impinging on the thicker nut portion for displacing said thinner nut portion relative to the other and thereby clamp the nut on said clutch member in adjusted position.

3. In a friction clutch the combination of a driving clutch member, a driven clutch member, one of said clutch members inluding a fixed abutment, separable friction plates between said driving and driven clutch members adapted to be pressed into frictional driving engagement, a friction plate actuating member intermediate said abutment and friction plates adapted to be oscillated about a vertical axis between an operative and an inoperative position and when in its operative position presses said friction plates into driving engagement with one another and when in its inoperative position permits separation of said clutch friction plates, an operating arm integral with and at right angles to said friction plate actuating member, said arm having a cam face through which it is operated for correspondingly oscillating the clutch friction plates actuating member, means operable with respect to said arm engaging its cam face and operating the arm, an adjustable thrust member nut threadedly carried by said one clutch member and between which and the fixed abutment said plates are pressed, said adjustable thrust member nut having a thrust face normal to its axis and a face remote from its thrust face and said adjustable thrust member being vertically slit to provide the nut, on one side of its axis, with portions extending, generally, at right angles to said nut axis and parallel with one another, said slit being formed at a point nearer the remote face than the thrust face to provide said nut portion including the thrust face being thicker than the nut portion including the remote face and with said nut portions slightly displaceable with respect to one another, and screw means threadedly mounted in said thinner nut portion and impinging on the thicker nut portion for effecting the displacement of said nut thinner portion and thereby clamp the nut on said clutch member in adjusted positions.

References Cited in the file of this patent

UNITED STATES PATENTS

| 1,745,079 | Conway | Jan. 28, 1930 |
| 1,753,085 | Peterson | Apr. 1, 1930 |
| 1,924,108 | Conway | Aug. 29, 1933 |
| 2,009,031 | Staples | July 23, 1935 |
| 2,561,833 | Wolf | July 24, 1951 |
| 2,641,345 | Dunkelow | June 9, 1953 |
| 2,694,430 | Andershock | Nov. 16, 1954 |
| 2,729,317 | Schwab | Jan. 3, 1956 |
| 2,773,370 | Intraub et al. | Dec. 11, 1956 |

FOREIGN PATENTS

| 124,594 | Austria | Sept. 25, 1931 |